M. E. MYERS AND M. A. J. HARPER.
CINEMATOGRAPH MACHINE.
APPLICATION FILED MAR. 29, 1917. RENEWED APR. 4, 1919.
1,357,076.
Patented Oct. 26, 1920.
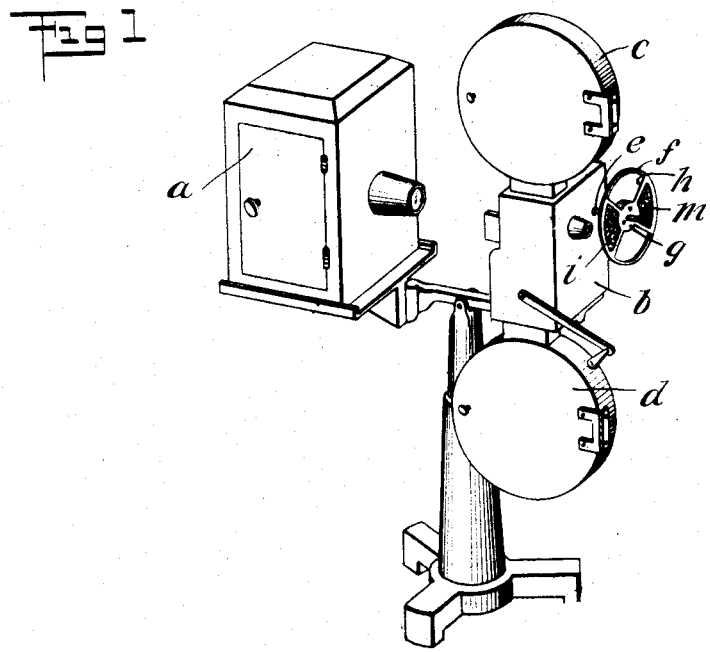
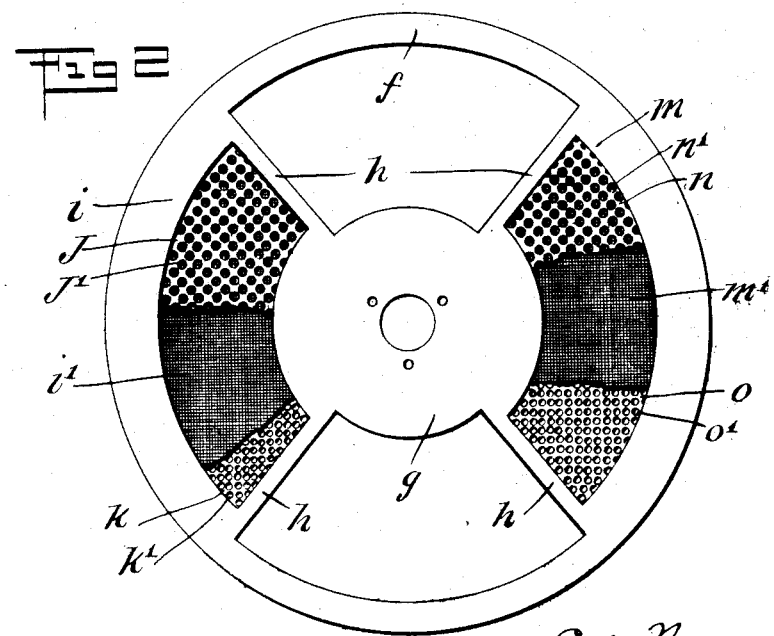

UNITED STATES PATENT OFFICE.

MORTON EARLE MYERS AND MARTIN A. J. HARPER, OF NEW YORK, N. Y.

CINEMATOGRAPH-MACHINE.

1,357,076.     Specification of Letters Patent.     Patented Oct. 26, 1920.

Application filed March 29, 1917, Serial No. 158,179. Renewed April 4, 1919. Serial No. 287,617.

*To all whom it may concern:*

Be it known that we, MORTON EARLE MYERS, a citizen of the United States, and MARTIN A. J. HARPER, a subject of the King of the United Kingdom of Great Britain and Ireland, both residing at the borough of Manhattan, in the city, county, and State of New York, have invented certain new and useful Improvements in Cinematograph-Machines, of which the following is a specification, reference being had therein to the accompanying drawings, which form a part thereof.

Our invention relates to cinematograph machines, and more particularly to the shutter mechanism thereof.

Heretofore in machines of this character various shutter mechanisms have been employed, the purpose of which has been to eliminate or reduce what is known as a "flicker" in the reproduction. In the older types of machines and in most of the machines now used, the shutter includes a plurality of rotating, opaque blades intercepting the light rays emanating from the projector, one of these blades being operative during the interval when the film is receiving movement, and the other blades being used to balance the light effects, so as to make the effect upon the projected image less conspicuous. While this type of shutter has proved commercially successful, it is open to the objection that the alternate lighting and shading of the screen, owing to persistence of vision, results in an optical illusion known as a "flicker". To obviate this difficulty, it has been attempted to use a shutter which by reason of its semi-opacity, or by the lens-like effect thereof, will merely dim the light upon the screen, or will diffuse the light in a manner to prevent the casting of deep shadows upon the screen, between the projection of images thereon. These expedients have not proven successful in use, because if a sufficient volume of light reaches the screen, the movement of the film will be apparent to the eye, this movement resulting in vertical streaks, or elongations of both the light and dark tones of the picture, which elongations are known to the art as "ghosts". When the light is diffused or refracted by means of lens-like formations, there is a light effect in the auditorium, which detracts from the quality of the projected image.

By experiment and use, we have determined that a small perforation in any part of the cover or flicker blade will result in the projection of a complete image upon the screen, and that by dimming the major portion of the light rays while permitting the image to be repeatedly and rapidly projected through a multitude of small openings, the flicker so objectionable with ordinary shutters may be practically eliminated, and the elongation of the tones of the image when the film is in motion, or "ghosts", may be entirely eliminated.

With this condition in mind, we have produced a shutter, the cover and flicker blades of which are formed of an opaque material having throughout the entire area thereof a multitude of irregularly arranged, closely juxtaposed openings the area of each of these openings being so small as to prevent the duration of the projection of the images therethrough being sufficient to result in the elongation of the image upon the screen or the formation of "ghosts" thereon, as to the cover blade, while the aggregate area of these openings is sufficiently great not to materially reduce the volume of light passing through the shutter. By the use of a shutter made in accordance with our invention we are enabled to avoid a loss in the effectiveness of the image projected upon the screen, by reason of the sharp contrast between a dark shadow upon the screen when opaque cover and flicker blades are used, which cause a "flicker" by reason of persistence of vision.

Our invention consists primarily in a cinematograph machine embodying therein a shutter composed of a cover blade and a flicker blade each formed of opaque material having a multitude of irregularly arranged, closely juxtaposed minute openings therethrough; and in such other novel features of construction and combination of parts, as are hereinafter set forth and described, and more particularly pointed out in the claims hereto appended.

Referring to the drawings,

Figure 1 is a perspective view of a cinematograph machine embodying therein a shutter made in accordance with our invention; and Fig. 2 is a detail view of the shutter detached from the machine.

Like letters refer to like parts in both views.

In the accompanying drawings, we have shown an ordinary cinematograph machine embodying therein a lamp structure shown at $a$, a lens box $b$ in which the feeding mechanism for the film is inclosed, and film reel cases $c$—$d$. This mechanism is old and well known in the art, and no particular construction thereof is essential to our invention.

Carried by a rotating shaft $e$ is a shutter consisting of a suitable frame $f$ and a hub $g$ connected by a plurality of spokes $h$. In the form of the invention shown, four of said spokes are used, a cover blade being supported between one pair of said spokes and a flicker blade being supported between the other pair of said spokes, an open space being provided between said blades, and each of the blades and each of the said spaces, being in length substantially 90°. The area of the cover blade, and of the flicker blade, need not be limited to that shown in the drawings, however, nor is it essential that only a single flicker blade be used. In some types of machines, it is preferable to use a single cover blade and a plurality of flicker blades, the areas of which and of the openings in the shutter have been accurately determined in connection with the opaque shutters now commonly used.

We have found, however, that a two blade shutter such as shown in the drawings, gives a satisfactory result with some types of projectors.

The construction of the cover blade, and of the flicker blade, and their operative effect in the operation of the projector are the same, excepting that when the cover blade is operative, the film is moving, and when the flicker blade is operative the film is stationary. A special characteristic of our invention is the use in these blades of a very fine mesh gauze-like sheet, formed of substantially opaque material and provided with a facing which will partially obscure the openings in this material in a manner to intercept a portion of the light rays coming from the lamp $a$ while permitting the major volume of these rays to pass through different portions of the blades. We have found that the use of gauze alone will not secure the desired result.

In the accompanying drawings, the shutter blade $i$ is shown as being composed of a sheet of metal gauze $i'$ having arranged on one side thereof a metal plate $j$ provided with a multitude of small, closely, juxtaposed openings $j'$ and having on the other side thereof a similar plate $k$, the openings $k'$ of which are of smaller diameter than the openings $j'$. The plates $j$—$k$ are preferably formed of thin gauze metal.

The flicker blade $m$ is composed of a gauze sheet $m'$ a plate $n$ having openings $n'$ corresponding with said plate $j$ in structure and function, and a plate $o$ having openings $o'$, corresponding with the plate $k$ in structure and function. The openings through the plates forming facings upon opposite sides of the gauze sheet are not in exact register, although their arrangement and size is such that they will necessarily overlap each other.

In practice, we have found that these plates alone will not secure the desired effects upon the screen, but that it is absolutely essential to use a gauze between same in order to still further break up the openings in these blades. With the use of a gauze alone the effect secured is merely a toning down of the picture by an effect similar to that secured by a coarse half tone screen, in photo-engraving work; due to the relatively large openings in the gauze as compared with the volume of opaque material constituting same. By using both the plate and the gauze, as the shutter rotates the light rays will be constantly interrupted by the opaque portion of the plates as well as the opaque portion of the gauze, thus causing a sequence of complete images to be rapidly projected upon the screen both when the cover blade is passing the lens opening and when the flicker blade is passing this opening. The gauze will have a dimming effect in the operation of the shutter as to all portions thereof without interfering with a projection of the image upon the screen.

The operation of the herein described machine is substantially as follows:

When a machine is in operation, the shutter receives one full rotation with the exposure of each individual photograph at the sight opening of the projector. Upon the initiation of the feeding movement of the film, the forward edge of the blade $i$ will pass before the lens opening, intercepting a portion of the light rays, but having the effect of merely dimming the light effect upon the screen. The large number of small openings throughout the entire area of this shutter will permit in the aggregate, a large volume of light to pass therethrough. The opaque portions of the blades $j$—$k$ will, however, rapidly intercept the light rays so that during the movement of the film there will be a succession of complete images projected upon the screen thus avoiding not only the casting of deep shadows upon the screen but preventing the formation of streaks, or "ghosts" upon the screen due to a visible movement of the image.

As the film comes to rest, the cover blade will pass from the lens opening, thus allowing the maximum volume of light rays to pass through the opening between the cover blade and the flicker blade. As the flicker blade passes the lens opening the tonal effects upon the screen will be modified in the manner above described. As the flicker blade passes from before the lens, the maximum volume of light rays will be again projected upon the screen. The rapidity in the movement of the shutter blade has the effect of securing an apparent uniformity in the illumination of the screen, by reason of the absence of sharp contrasts between those intervals when the cover and flicker blades appear to be operative and when they are not operative, or in other words avoiding a "flicker" in the reproduction.

The effect secured by a shutter made in accordance with our invention is dependent upon the use of substantially opaque cover and flicker blades having sufficiently closely juxtaposed open areas and opaque areas, to permit a substantial volume of light to be projected upon the screen at all times while causing a succession of images to be rapidly projected upon the screen and avoiding the presence of any substantial shadows from said blades upon the screen. In this manner sharp contrasts of light and dark tones upon the screen during any one cycle of operation of the projector, is avoided and the actual lineal traverse of the screen or the results therefrom, are not apparent. The rapidity with which succeeding images are cast upon the screen while the film is in motion and the cover blade is operative, will leave no substantial impression through the eye, while reductions of the illumination of the screen will avoid that impression upon the optic nerve resulting from the presence of a deep shadow upon the screen.

We have ascertained by experiment and use, that the various openings in the shutter blade must be very small, and must be separated by a substantially opaque area which will intercept the light rays or a material portion thereof. We have also found that it is essential to use both a cover blade and a flicker blade, or blades of substantially the same construction, in order to secure the desired effect.

If the openings through the shutter be numerous and fairly large the desired uniform tonal effects upon the screen cannot be secured and the flicker will be accentuated, rather than relieved.

The aggregate area of the open spaces in the blades of a shutter made in accordance with our invention, is sufficiently great to secure a fairly bright illumination of the screen during the intervals when these blades are operative; and it is possible to operate a projector using a shutter made in accordance with our invention, with much lower power than is possible with shutters wherein a deep shadow is cast upon the screen, either by the interposition of an opaque blade between the lens and the screen, or a blade which by diffusion or refraction prevents the light rays from reaching the screen.

It is not our intention to limit the invention to the details of construction shown in the accompanying drawings, it being apparent that such may be modified to adapt the shutter to different types of machines without departing from the spirit and scope of the invention.

Having described the invention what we claim as new, and desire to have protected by Letters Patent is:—

1. A cinematograph machine embodying therein a shutter having a cover blade formed of a plate of opaque material having a multitude of closely juxtaposed openings therethrough, and means carried by said plate and projecting across said openings respectively so as to partially cover each of said openings whereby a dimming of the light rays passing through said blade is secured.

2. A cinematograph machine embodying therein a shutter composed of a cover blade and a flicker blade each formed of a sheet of gauze and a facing therefor adapted to make portions of said gauze opaque, while leaving a multitude of irregularly arranged, closely juxtaposed minute openings therethrough.

3. A cinematograph machine embodying therein a shutter composed of a cover blade and a flicker blade each formed of a sheet of gauze, and facing plates on opposite sides thereof, said facing plates being of opaque material having a plurality of closely juxtaposed minute openings therethrough.

4. A cinematograph machine embodying therein a shutter composed of a frame, a hub by means of which said shutter may be rotated, a cover blade, and a flicker blade supported respectively between said hub and said frame, an open space being provided within said frame between said blades, each of said blades being formed of a plate of opaque material having a multitude of closely juxtaposed openings therethrough, and means carried by said plate and projecting across said openings respectively so as to partially cover each of said openings whereby a dimming of the light rays passing through said blades respectively is secured.

5. A cinematograph machine embodying therein a shutter composed of a frame, a hub by means of which said shutter may be rotated, a cover blade and a flicker blade supported respectively between said hub and said frame, an open space being provided in said frame within said blades, each of said blades being formed of a sheet of gauze and a facing therefor adapted to make portions of said gauze opaque, while leaving a multitude of irregularly arranged, closely juxtaposed minute openings therethrough.

6. A cinematograph machine embodying therein a shutter composed of a frame, a hub by means of which said shutter may be rotated, a cover blade and a flicker blade supported respectively between said hub and said frame, an open space being provided in said frame within said blades, each of said blades being formed of a sheet of gauze, and facing plates on opposite sides thereof, said facing plates being of opaque material having a plurality of closely juxtaposed, minute openings therethrough.

In witness whereof, we have hereunto affixed our signatures, in the presence of two subscribing witnesses, this 28th day of March, 1917.

MORTON EARLE MYERS.
MARTIN A. J. HARPER.

Witnesses:
CLARICE FRANCK,
BERTHA MUELLER.